(12) United States Patent
Eymard et al.

(10) Patent No.: US 9,781,404 B2
(45) Date of Patent: Oct. 3, 2017

(54) 3D VIDEO TRANSMISSION ON A LEGACY TRANSPORT INFRASTRUCTURE

(71) Applicant: STMICROELECTRONICS (GRENOBLE 2) SAS, Grenoble (FR)

(72) Inventors: Frankie Eymard, Voiron (FR); Jean-Louis Labyre, Sassenage (FR)

(73) Assignee: STMICROELECTRONICS (GRENOBLE 2) SAS, Grenoble (FR)

( * ) Notice: Subject to any disclaimer, the term of this patent is extended or adjusted under 35 U.S.C. 154(b) by 0 days.

(21) Appl. No.: 14/953,938

(22) Filed: Nov. 30, 2015

(65) Prior Publication Data

US 2016/0080722 A1    Mar. 17, 2016

Related U.S. Application Data

(62) Division of application No. 13/825,192, filed as application No. PCT/FR2011/052123 on Sep. 15, 2011.

(30) Foreign Application Priority Data

Sep. 24, 2010 (FR) ...................................... 10 03788

(51) Int. Cl.
H04N 13/00 (2006.01)
H04N 7/24 (2011.01)
H04N 19/16 (2014.01)

(52) U.S. Cl.
CPC ........... *H04N 13/0059* (2013.01); *H04N 7/24* (2013.01); *H04N 13/0003* (2013.01); *H04N 13/0007* (2013.01); *H04N 13/0048* (2013.01); *H04N 19/16* (2014.11); *H04N 2013/0088* (2013.01)

(58) Field of Classification Search
None
See application file for complete search history.

(56) References Cited

U.S. PATENT DOCUMENTS

| 4,658,291 | A | | 4/1987 | Morishita | |
|---|---|---|---|---|---|
| 5,142,357 | A | * | 8/1992 | Lipton | ................. H04N 5/2259 348/48 |
| 6,427,026 | B1 | * | 7/2002 | Hein | ...................... H04N 19/61 375/E7.094 |

(Continued)

FOREIGN PATENT DOCUMENTS

| CN | 1168053 | 12/1997 |
|---|---|---|
| CN | 102415100 | 4/2012 |

OTHER PUBLICATIONS

CableLabs, "OpenCable Specification-Content Encoding Profiles 3.0 Specification", Dec. 2012, pp. 1-32 See Priority U.S. Appl. No. 13/825,192, filed Mar. 20, 2013.

*Primary Examiner* — Mohammad J Rahman
(74) *Attorney, Agent, or Firm* — Slater Matsil, LLP

(57) ABSTRACT

The present disclosure relates to a method for transmitting two consecutive pairs of images. The method may include decimating each image with a ratio of 2, assembling the two decimated images of each pair in a composite image, transmitting the composite images, and reconstructing complete images from the composite images. In decimation, the information removed from the images of the first pair may be kept in the images of the second pair, from the spatial point of view, and the complete images may be reconstructed by de-interlacing processing from the composite images.

23 Claims, 2 Drawing Sheets

(56) References Cited

U.S. PATENT DOCUMENTS

| | | | | |
|---|---|---|---|---|
| 6,765,568 B2* | 7/2004 | Swift | H04N 7/17318 345/419 |
| 7,505,013 B2* | 3/2009 | Love | A63F 13/00 345/1.3 |
| 7,580,463 B2* | 8/2009 | Routhier | H04N 13/0029 348/51 |
| 8,427,469 B2* | 4/2013 | Suh | H04N 13/0048 345/419 |
| 8,533,166 B1* | 9/2013 | Sulieman | H04L 69/04 375/240 |
| 8,891,010 B1* | 11/2014 | Woodall | H04N 21/440263 348/445 |
| 2002/0008907 A1* | 1/2002 | Yamamoto | H04N 13/021 359/464 |
| 2002/0021832 A1 | 2/2002 | Dawson | |
| 2002/0126396 A1* | 9/2002 | Dolgoff | G02B 27/2278 359/743 |
| 2003/0128273 A1* | 7/2003 | Matsui | H04N 13/0003 348/51 |
| 2003/0223499 A1* | 12/2003 | Routhier | H04N 13/0029 375/240.25 |
| 2005/0117637 A1* | 6/2005 | Routhier | H04N 13/0029 375/240.01 |
| 2006/0012676 A1 | 1/2006 | Tomita | |
| 2006/0153289 A1* | 7/2006 | Choi | H04N 19/597 375/240.01 |
| 2006/0250503 A1 | 11/2006 | Crutchfield | |
| 2006/0263758 A1 | 11/2006 | Crutchfield | |
| 2007/0153380 A1* | 7/2007 | Shestak | G02B 27/2214 359/463 |
| 2007/0165305 A1 | 7/2007 | Mehrle | |
| 2008/0165275 A1* | 7/2008 | Jones | H04N 13/004 348/446 |
| 2008/0303895 A1 | 12/2008 | Akka et al. | |
| 2009/0128620 A1* | 5/2009 | Lipton | H04N 13/0048 348/42 |
| 2009/0136083 A1* | 5/2009 | Picard | G06T 1/0028 382/100 |
| 2009/0252370 A1* | 10/2009 | Picard | G06T 1/0028 382/100 |
| 2010/0053305 A1* | 3/2010 | Guillou | H04N 13/0048 348/43 |
| 2010/0066817 A1 | 3/2010 | Zomet | |
| 2010/0111195 A1* | 5/2010 | Fortin | G06T 3/40 375/240.26 |
| 2010/0135379 A1* | 6/2010 | Fortin | H04N 19/597 375/240.01 |
| 2010/0177161 A1* | 7/2010 | Curtis | H04N 13/0059 348/43 |
| 2011/0069225 A1* | 3/2011 | Routhier | H04N 7/122 348/443 |
| 2011/0080466 A1 | 4/2011 | Kask | |
| 2011/0102554 A1* | 5/2011 | Saito | G09G 3/003 348/51 |
| 2011/0134214 A1* | 6/2011 | Chen | H04N 19/597 348/43 |
| 2011/0149026 A1* | 6/2011 | Luthra | H04N 13/004 348/43 |
| 2011/0157331 A1* | 6/2011 | Jang | H04N 13/0029 348/54 |
| 2011/0164110 A1* | 7/2011 | Fortin | H04N 13/0048 348/43 |
| 2012/0013651 A1* | 1/2012 | Trayner | G02B 5/32 345/690 |
| 2012/0026288 A1* | 2/2012 | Tourapis | H04N 19/597 348/43 |

* cited by examiner

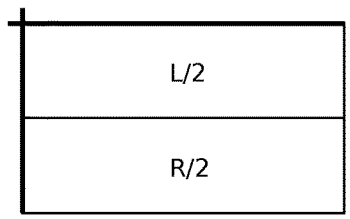
Fig 1a
3D HD TaB
PRIOR ART
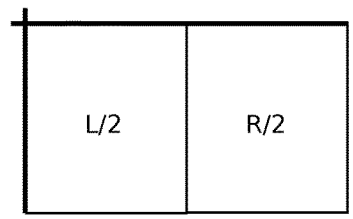
Fig 1b
3D HD SbS
PRIOR ART
 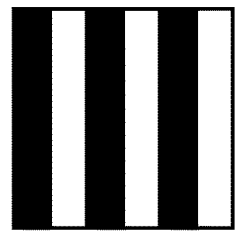 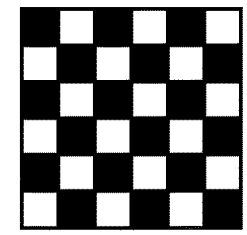
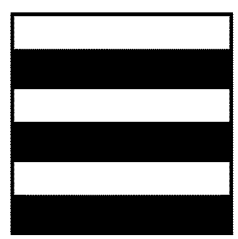 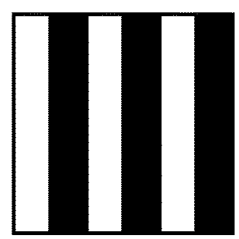 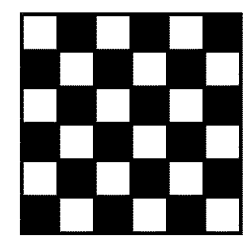
Fig 2a
PRIOR ART
Fig 2b
PRIOR ART
Fig 2c
PRIOR ART Fig 3
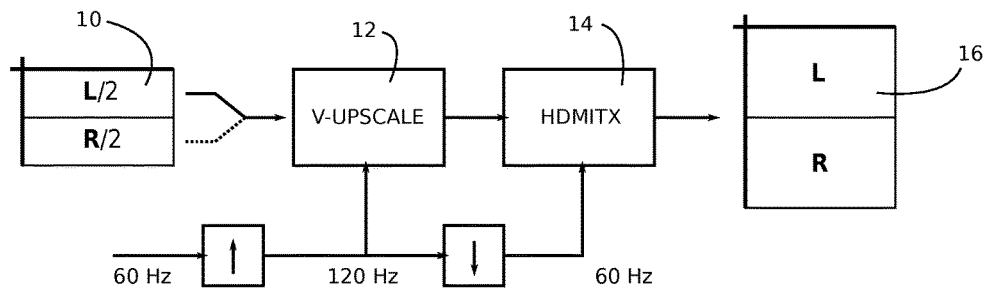
PRIOR ART
Fig 4a
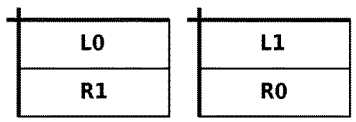
Fig 4c
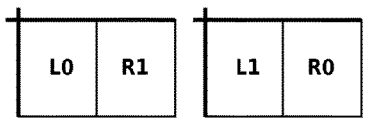
Fig 4b
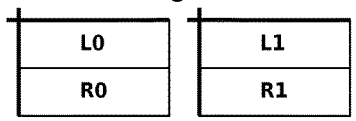
Fig 4d
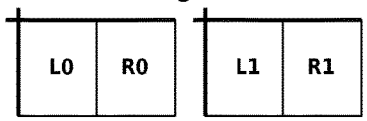
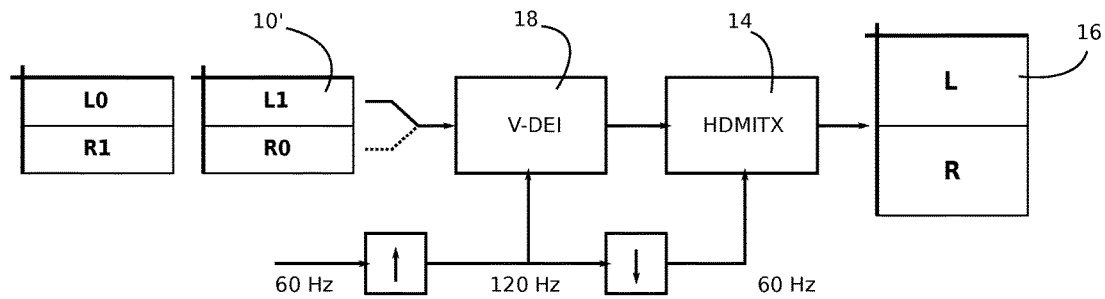
Fig 5

3D VIDEO TRANSMISSION ON A LEGACY TRANSPORT INFRASTRUCTURE

FIELD OF THE INVENTION

The present disclosure relates to transmission of three-dimensional (3D) video streams on legacy transport infrastructures for transmitting two-dimensional (2D) high-definition video streams.

BACKGROUND OF THE INVENTION

The new High-Definition Multimedia Interface (HDMI) standards (versions 1.4 and 1.4a), defining an interface for transmission of decoded programs to final player equipment, provide for transfer of full-resolution high-definition 3D video streams, i.e. transfer of two stereoscopic full-resolution HD views, which doubles the transmission pass band. This pass band is not available on current transport infrastructures (satellite, DTTV, cable).

Pending a transport infrastructure dedicated to 3D programs, the interested parties and normalization committees (DVB, HDMI, MPEG) are working on approaches enabling 3D video to be transmitted on existing transport infrastructures. The progress is published on the Websites of these committees. It is sought to insert two views in place of each image in the transported stream and, by way of minor modifications to the reception equipment, to reconstruct the two views in a format compatible with the HDMI standard. As existing transport infrastructures are not designed for this, the resolution of the views may have to be downgraded.

Among the different transport formats that have been reviewed, two generic candidates have been identified: Top-and-Bottom (TaB) and Side-by-Side (SbS). Each of these generic formats can be combined with an existing 2D high definition (HD) format of the progressive type, i.e. the 50 Hz and 60 Hz variants of the 720p format and the 1080p format at 24 Hz. Only the SbS generic format is combined with the 50 and 60 Hz variants of the 1080i interlaced format.

FIG. 1a represents an HD image according to the TaB format, i.e. a composite image. The top half of the image comprises the left stereoscopic view L at half the vertical resolution, and the bottom half comprises the right stereoscopic view R, also at half the vertical resolution.

FIG. 1b represents an HD image, also composite, according to the SbS format. The left half of the composite image comprises the left stereoscopic view L at half the horizontal resolution, and the right half of the composite image comprises the right stereoscopic view R, also at half the horizontal resolution.

FIGS. 2a to 2c illustrate decimation matrices that have been proposed for reducing the resolution of the stereoscopic images so as to be able to transport the latter in TaB or SbS format.

The complementary matrices of FIG. 2a enable one line out of two to be kept to create an image in TaB format (FIG. 1a). The top matrix keeps the odd lines and the bottom matrix keeps the even lines.

The complementary matrices of FIG. 2b enable one column out of two to be kept to create an image in SbS format (FIG. 1b). The top matrix keeps the odd columns and the bottom matrix keeps the even columns.

The matrices of FIG. 2c, called quincunx (checkerboard) matrices, enable one pixel out of two to be kept per line and per column. In the top matrix, the process starts from a pixel in the top left corner. The bottom matrix defines the complementary decimation. The pixels kept by application of these matrices are compacted by lines for the TaB format or compacted by columns for the SbS format.

There appears to be no consensus on the choice of decimation matrices. The CableLabs consortium is the first to propose a choice in the document OpenCable Specifications, Content Encoding Profiles 3.0 Specification, C-SP-CEP3.0-I01-100827, section 10.2, sub-paragraph #6, published on their Website on Aug. 27, 2010. It proposes using the same matrix for all the images, more precisely one of the matrices of FIG. 2a.

FIG. 3 schematically illustrates an example of a reception chain of TaB composite images. The composite images 10 reach a vertical interpolator 12 at the refresh frequency, for example, 60 Hz. The interpolator completes the left half-resolution image L of the composite image with the missing lines and then does the same with the right half-resolution image R. The interpolator works at twice the refresh frequency (120 Hz) and supplies the two obtained, left and right, full-resolution HD images to an HDMI transmission circuit 14 at this frequency. Circuit 14 assembles the left and right images into a double-resolution image 16, for example, of double height, and transmits the latter at the initial refresh frequency (60 Hz) to a 3D display. To process SbS composite images, interpolator 12 would be replaced by a horizontal interpolator completing the half-resolution images with the missing columns. It is noteworthy that these transmission techniques divide the spatial resolution of the stereoscopic views by 2.

SUMMARY OF THE INVENTION

An approach is disclosed whereby the spatial resolution of the stereoscopic views transported on a legacy infrastructure can be enhanced.

A method is provided for transmitting two consecutive pairs of images and may comprise decimating each image with a ratio of 2, assembling the two decimated images of each pair in a composite image, transmitting the composite images, and reconstructing complete images from the composite images. In decimation, the information removed from the images of the first pair are kept in the images of the second pair, from the spatial point of view, and the complete images are reconstructed by de-interlacing processing from the composite images.

According to one embodiment, the information removed by decimation from the first image of a pair is kept, from the spatial point of view, in the second image of the pair.

According to one embodiment, decimation removes the lines of a first parity in the first image of a first of the two pairs, the lines of a second parity in the second image of the first pair, the lines of second parity in the first image of the second pair, and the lines of first parity in the second image of the second pair.

Other advantages and features will become more clearly apparent from the following description of particular embodiments of the present disclosure given for non-restrictive example purposes only and represented in the appended drawings, in which:

BRIEF DESCRIPTION OF THE DRAWINGS

FIGS. 1a and 1b illustrate two proposed image formats for transporting stereoscopic images on prior art infrastructures;

FIGS. 2a to 2c illustrate proposed decimation matrices to reduce the spatial resolution of the stereoscopic images to be transported according to the formats of FIGS. 1a and 1b;

FIG. 3, described in the above, represents a processing chain, on reception, of transported images according to the format of FIG. 1a, according to the prior art;

FIGS. 4a to 4d represent particular combinations of the parities of the lines or columns used in two consecutive composite images, which, with adequate processing, may enable the spatial resolution to be substantially enhanced, according to the present invention; and FIG. 5 is a schematic diagram of a processing chain designed to make use of the composite images of FIGS. 4a and 4b, according to the present invention.

DETAILED DESCRIPTION OF THE PREFERRED EMBODIMENTS

In order to increase the spatial resolution of images that have been decimated, in particular, to transport the latter on a legacy infrastructure, it is disclosed to use de-interlacing techniques rather than spatial interpolation techniques. De-interlacing techniques do in fact enable spatial information to be retrieved, from two consecutive frames, on account of the fact that the missing lines in one frame are found in the following frame with a temporal offset.

For this purpose, consecutive composite images, even if they originate from decimation of progressive images, are made to conform to an interlaced video stream.

FIGS. 4a to 4d illustrate combinations of possible parities of lines or columns in the previously described composite image formats, enabling an interlaced video stream to be reproduced. The combinations of parities affect two consecutive composite images, which thereby become two consecutive frames of an interlaced stream.

FIG. 4a illustrates two consecutive composite TaB images conformed in two consecutive frames. The top half of the first frame (on the right) includes the odd lines (suffix "1") of the corresponding first left view L. The bottom half of this frame includes the even lines (suffix "0") of the corresponding first right view R.

The second frame (on the left), constructed by decimation of a second pair of stereoscopic views, includes the lines that are missing, from the spatial point of view, from the first frame. In other words, the top half of the frame includes the even lines (suffix "0") of the second left view L. The bottom half of the frame includes the odd lines (suffix "1") of the second right view R.

FIG. 4b corresponds to an alternative embodiment of FIG. 4a. Instead of using different parities in the top and bottom halves of each frame, the same parity is used. The first frame thus includes the odd lines of the first pair of left and right views and the second frame includes the even lines of the second pair of left and right views.

FIG. 4c illustrates the combination of parities of FIG. 4a applied to SbS composite images. In other words, the left half of the first frame includes the odd columns of the first left view, and the right half of the first frame includes the even columns of the first right view. The left half of the second frame includes the even columns of the second left view, and the right half of the second frame includes the odd columns of the second right view.

FIG. 4d illustrates the combination of parities of FIG. 4b applied to SbS composite images. In other words, the first frame includes the odd columns of the first pair of left and right views, and the second frame includes the even columns of the second pair of left and right views.

For streams formatted according to FIGS. 4a and 4b, vertical de-interlacing may be used, of the type used for conventional interlaced streams. For streams formatted according to FIGS. 4c and 4d, horizontal de-interlacing may be performed. To achieve this, the vertical de-interlacing techniques may simply be transposed.

The de-interlacing principles can also apply if quincunx decimation matrices are used (FIG. 2c). Views decimated by way of these matrices can be transported in either of the TaB and SbS formats, according to the compacting direction of the pixels. The parities 1 and 0 used in FIGS. 4a to 4d then respectively identify the first and second matrices of FIG. 2c. Diagonal de-interlacing may be operated on the frames constituted in this way. Variants of complementary parity to each of the FIGS. 4a to 4d are naturally available.

FIG. 5 schematically illustrates a processing chain that can be suitable for processing an interlaced stream according to the formats of FIGS. 4a and 4b. Such a processing chain may be available in typical HD reception equipment, in particular to process the 1080i format. According to this format, each frame includes 540 lines and the parity of the lines alternates from one frame to the next.

Frames 10', represented according to the format of FIG. 4a, arrive at a frequency of 60 Hz, for example, on a vertical de-interlacing circuit 18. This circuit performs de-interlacing on two consecutive frames, for example (the number of frames on which de-interlacing is performed, and therefore the number of frames that circuit 18 stores in advance, depends on the technique used). Among the available de-interlacing techniques, the following may be used: reverse film mode using film mode detection techniques, motion adaptive de-interlacing, and motion compensated de-interlacing. De-interlacing is first performed on the top halves of the consecutive frames, for example, to produce a progressive full-resolution left image, and then on the bottom halves of the consecutive frames to produce a progressive full-resolution right image. These two full-resolution images are produced at twice the refresh frequency, here at 120 Hz. As in FIG. 3, these images are then processed by an HDMI transmission circuit 16.

De-interlacing circuit 18 is typically intended to process frames of 540 lines at the most, to produce progressive images of 1080 lines at the refresh frequency rate, here 60 Hz. To process frames according to FIGS. 4a and 4b, it would process 720-line frames and produce images at twice the frequency. It would further be configured to produce a full-resolution image from each half frame it receives. In fact, these operational details can most of the time be dealt with in software by updating the firmware of existing equipment intended for 2D HD video reception.

This approach, with the frame formats of FIGS. 4a and 4b, thereby enables 3D HD programs with a quality between full resolution and half-resolution to be transmitted on existing transport infrastructures, and enables these programs to be viewed on existing reception equipment (through a simple firmware update in a large number of cases). The display equipment should of course be 3D video-capable.

To process frames according to the formats of FIGS. 4c and 4d, the circuit 18 would be designed to perform horizontal de-interlacing. This is no more complex than vertical de-interlacing, but it is likely that existing reception equipment will not be able to do this through a simple firmware update.

The formats of FIGS. 4c and 4d may in particular be used to transport a 3D video stream in SbS 1080i format. In this case, circuit 18 performs horizontal de-interlacing to reconstitute the left and right views in full horizontal resolution in 1080i format. The circuit 18 may simultaneously perform conventional de-interlacing to obtain a 1080p format. Vertical de-interlacing can also be delegated to a conventional de-interlacing circuit often provided downstream from the HDMI interface, for example in a television set.

To process frames where decimation has been performed using the quincunx matrices of FIG. 2c, circuit 18 would be designed to perform diagonal de-interlacing.

Among the formats of FIGS. 4a to 4d, the formats of FIGS. 4a and 4c are preferred, i.e. where the parities of information of the left and right views of a frame are opposite. This enables an exact full-resolution image to be constructed, when the left and right views corresponding to a frame are spatially correlated, by combining the odd lines of the left view and the even lines of the right view (or vice-versa).

That which is claimed is:

1. A method for transmission of two consecutive pairs of stereoscopic two dimensional (2D) images, each pair of stereoscopic 2D images defining a three-dimensional (3D) image, the method comprising:
   decimating each stereoscopic 2D image with a ratio of 2;
   assembling a first portion of the two decimated stereoscopic 2D images into a first composite image, and assembling a second portion of the two decimated stereoscopic 2D images into a second composite image to define a pair of composite images;
   transmitting the pair of composite images as time-consecutive frames; and
   reconstructing complete stereoscopic 2D images from the time-consecutive frames through a de-interlacing process that spatially combines a row or column of a first one of the time-consecutive frames with a row or column of a second one of the time-consecutive frames, the de-interlacing process being free from an interpolation step, and by reconstructing each stereoscopic 2D image from data kept in the other composite image.

2. The method according to claim 1 wherein the information removed by decimation from the first stereoscopic 2D image of a pair of stereoscopic 2D images is kept, from the spatial point of view, in the second stereoscopic 2D image of the pair of stereoscopic 2D images.

3. The method according to claim 2 wherein decimation removes lines of a first parity in the first stereoscopic 2D image of the first of the two pairs of stereoscopic 2D images.

4. The method according to claim 3 wherein decimation removes lines of a second parity in the second stereoscopic 2D image of the first pair of stereoscopic 2D images.

5. The method according to claim 4 wherein decimation removes lines of the second parity in the first stereoscopic 2D image of the second pair of stereoscopic 2D images.

6. The method according to claim 5 wherein decimation removes lines of the first parity in the second stereoscopic 2D image of the second pair of stereoscopic 2D images.

7. The method according to claim 1 wherein the two stereoscopic 2D images of each pair of stereoscopic 2D images are stereoscopic views from a spatial point of view.

8. The method according to claim 1 wherein the pair of composite images is based upon the 1080i standard.

9. A method for transmission of two consecutive pairs of stereoscopic two dimensional (2D) images, each pair of stereoscopic 2D images defining a three-dimensional (3D) image, the method comprising: decimating each stereoscopic 2D image; assembling a first portion of the two decimated stereoscopic 2D images into a first composite image, and assembling a second portion of the two decimated stereoscopic 2D images into a second composite image to define a pair of composite images; transmitting the pair of composite images as time-consecutive frames; and reconstructing complete stereoscopic 2D images from the time-consecutive frames through a de-interlacing process that spatially combines, without interpolating, a row or column of a first one of the time-consecutive frames with a row or column of a second one of the time-consecutive frames and by reconstructing each stereoscopic 2D image from data kept in the other composite image.

10. The method according to claim 9 wherein the information removed by decimation from the first stereoscopic 2D image of a pair of stereoscopic 2D images is kept, from the spatial point of view, in the second stereoscopic 2D image of the pair of stereoscopic 2D images.

11. The method according to claim 10 wherein decimation removes lines of a first parity in the first stereoscopic 2D image of the first of the two pairs of stereoscopic 2D images.

12. The method according to claim 11 wherein decimation removes lines of a second parity in the second stereoscopic 2D image of the first pair of stereoscopic 2D images.

13. The method according to claim 12 wherein decimation removes lines of the second parity in the first stereoscopic 2D image of the second pair of stereoscopic 2D images.

14. The method according to claim 13 wherein decimation removes lines of the first parity in the second stereoscopic 2D image of the second pair of stereoscopic 2D images.

15. The method according to claim 9 wherein the two stereoscopic 2D images of each pair of stereoscopic 2D images are stereoscopic views from a spatial point of view.

16. The method according to claim 9 wherein the pair of composite images is based upon the 1080i standard.

17. A method for transmission of two consecutive pairs of stereoscopic two dimensional (2D) images, with the two stereoscopic 2D images of each pair of stereoscopic 2D images being stereoscopic views from a spatial point of view, each pair of stereoscopic 2D images defining a three-dimensional (3D) image, the method comprising: decimating each stereoscopic 2D image with a set ratio; assembling a first portion of the two decimated stereoscopic 2D images into a first composite image, and assembling a second portion of the two decimated stereoscopic 2D images into a second composite image to define a pair of composite images; transmitting the pair of composite images as time-consecutive frames; and reconstructing complete stereoscopic 2D images from the time-consecutive frames through a de-interlacing process configured to place, without interpolating, a row or column of a first one of the time-consecutive frames next to a row or column of a second one of the time-consecutive frames and by reconstructing each stereoscopic 2D image from data kept in the other composite image.

18. The method according to claim 17 wherein the information removed by decimation from the first stereoscopic 2D image of a pair of stereoscopic 2D images is kept, from the spatial point of view, in the second stereoscopic 2D image of the pair of stereoscopic 2D images.

19. The method according to claim 18 wherein decimation removes lines of a first parity in the first stereoscopic 2D image of the first of the two pairs of stereoscopic 2D images.

20. The method according to claim 19 wherein decimation removes lines of a second parity in the second stereoscopic 2D image of the first pair of stereoscopic 2D images.

21. The method according to claim 20 wherein decimation removes lines of the second parity in the first stereoscopic 2D image of the second pair of stereoscopic 2D images.

22. The method according to claim 21 wherein decimation removes lines of the first parity in the second stereoscopic 2D image of the second pair of stereoscopic 2D images.

23. The method according to claim 17 wherein the pair of composite images is based upon the 1080i standard.

* * * * *